UNITED STATES PATENT OFFICE.

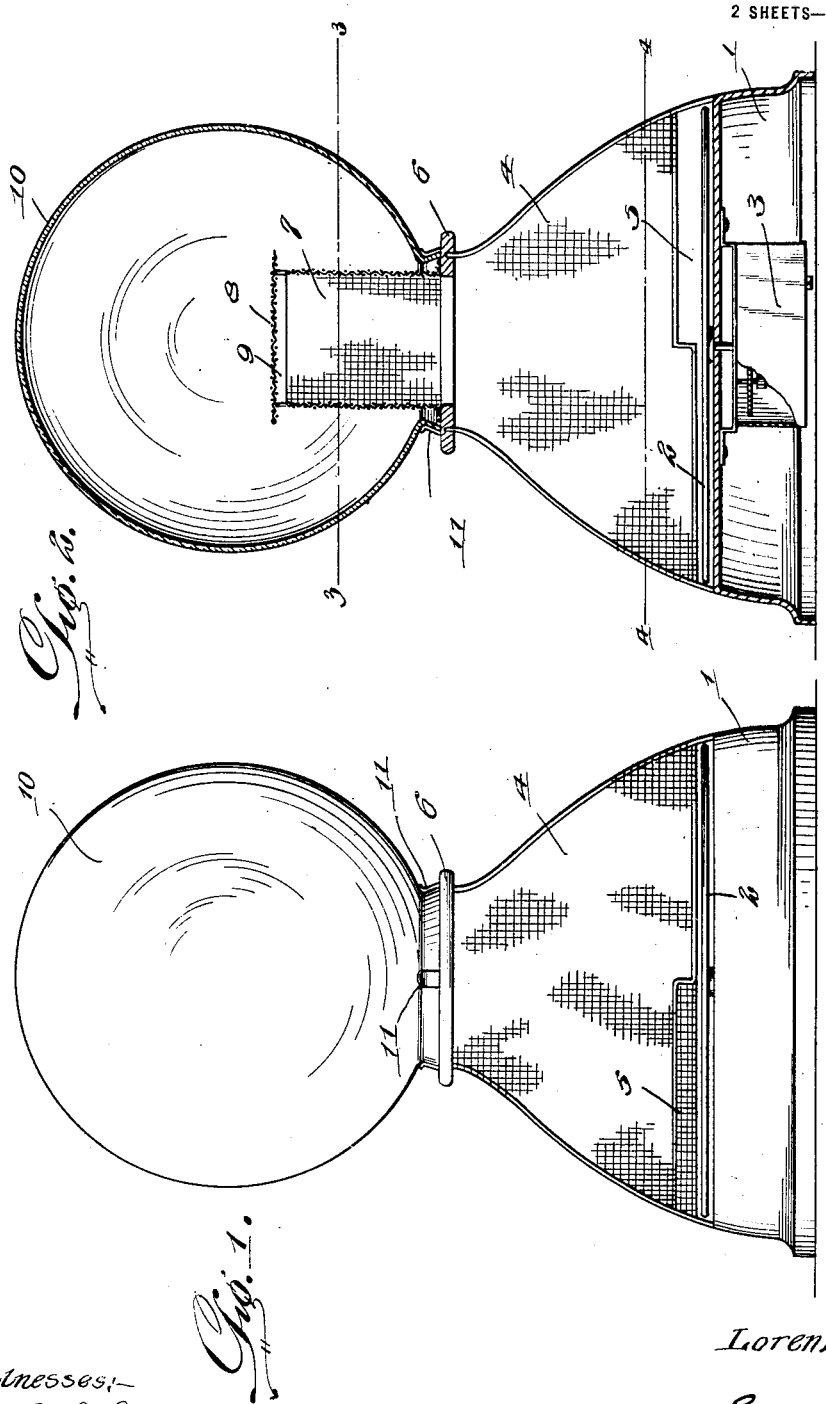

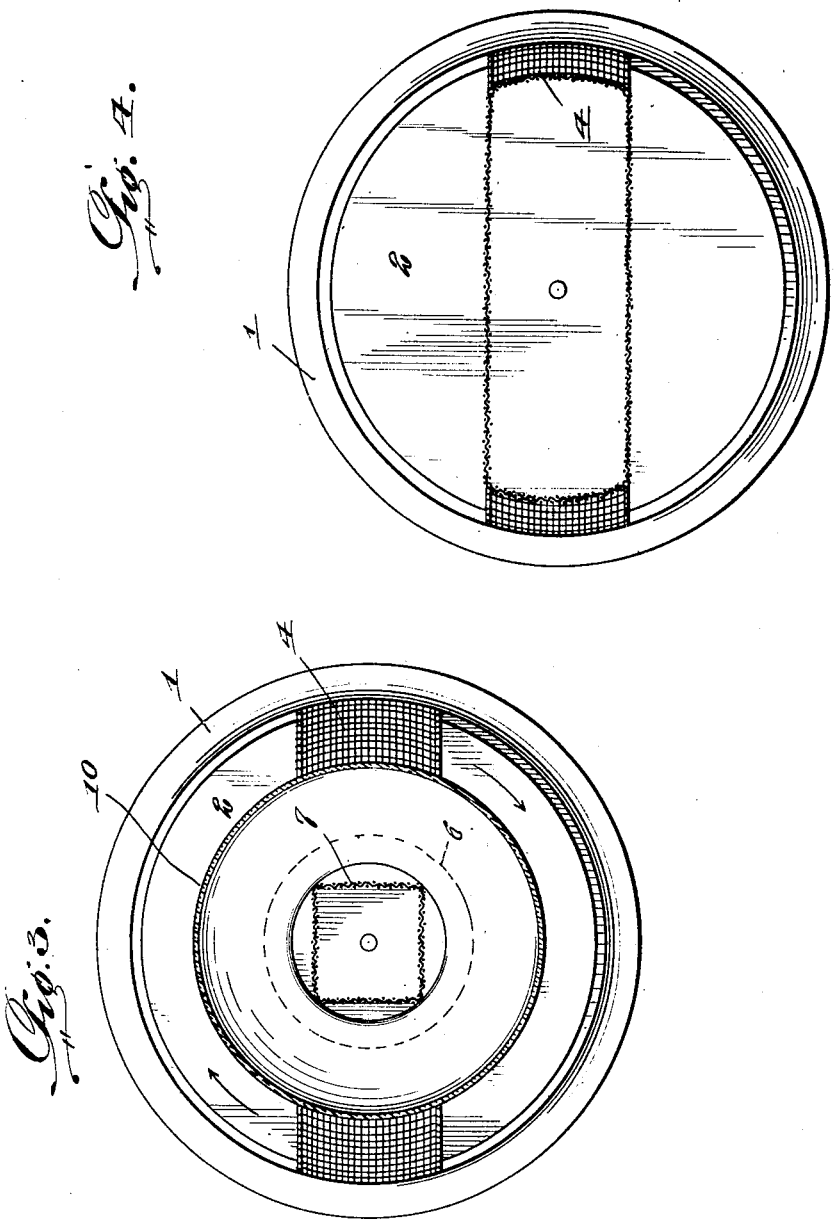

LORENZO CUSI, OF NEW YORK, N. Y.

FLYTRAP.

1,370,414.   Specification of Letters Patent.   Patented Mar. 1, 1921.

Application filed January 26, 1920. Serial No. 353,949.

*To all whom it may concern:*

Be it known that I, LORENZO CUSI, citizen of Spain, residing at New York, in the county of New York, and State of New York, have invented new and useful Improvements in Flytraps, of which the following is a specification.

This invention relates to means for catching flies and other insects and the principal object of the invention is to provide a slowly moving platform for containing the bait with a cage for catching the flies after the platform brings them into the same.

Another object of the invention is to provide a spring motor for rotating the platform and a glass globe for attracting the flies from the trap.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of the device.

Fig. 2 is a longitudinal section.

Fig. 3 is a cross section on line 3—3 of Fig. 2.

Fig. 4 is a cross section on line 4—4 of Fig. 2.

In these views 1 indicates a base on which is rotatably mounted a platform 2. The shaft of this platform passes downwardly within the base and is suitably geared to a spring motor 3 of any suitable construction. When this motor is wound up the platform is caused to revolve. It is provided with suitable means for stopping it when desired and for regulating its speed. As shown the base and platform are of circular formation. A cage 4 made of wire gauze or the like has its lower end supported on the base. This cage is of substantially oblong form and extends across the central part of the base with its end parts extending downwardly and secured to the base. Its side pieces are located above the platform and each side piece is cut-away at its lower edge to provide an opening 5. One of the openings is arranged adjacent one end of the cage and the other at the other end. The ends of this cage are curved upwardly and inwardly and a band 6 is connected with the upper edge of the cage. An extension 7 is formed or secured to the upper end of the cage and the top of this extension is closed by a plate 8. Small openings 9 are formed in this extension immediately under said top. A glass globe 10 has its small open end detachably connected with the band 6 by the spring clips 11. This globe surrounds the extension 7 as will be seen.

Suitable bait is placed on the platform and the spring motor wound up to slowly rotate said platform, the flies attracted by the bait will light on the platform and will be carried by the slowly moving platform through the openings 5 into the cage. The depending side of the cage opposite each opening will prevent the flies from being carried out of the cage again and in attempting to escape the flies will naturally fly upwardly through the device into the extension 7 and will pass through the openings 9 into the glass globe. The openings 9 are so formed as to prevent the return of the flies and thus they will be trapped within the globe. After a sufficient number of flies have been caught the globe may be removed and the flies destroyed.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

A device of the class described comprising a base, a rotary platform thereon, a motor in the base for rotating the platform, a cage rectangular in horizontal section carried by the base above the platform and having its opposite sides cut away at the opposite ends to provide openings therein through which the platform will carry the flies, a transparent globe carried by the top of the cage and a cylindrical extension of the cage within the vertical axis of the globe having openings therein for permitting the flies to pass from the cage into the globe.

In testimony whereof I affix my signature.

LORENZO CUSI.